(12) United States Patent
Tahara et al.

(10) Patent No.: US 7,870,002 B2
(45) Date of Patent: *Jan. 11, 2011

(54) COMPUTER, DISPLAY CONTROL DEVICE, POINTER POSITION CONTROL METHOD, AND PROGRAM

(75) Inventors: Yoshinori Tahara, Yamato (JP); Tooru Tabara, Kanagawa-ken (JP); Reiko Kawase, Machida (JP); Masaru Horioka, Sagamihara (JP)

(73) Assignee: Nuance Communications, Inc., Burlington, MA (US)

( * ) Notice: Subject to any disclaimer, the term of this patent is extended or adjusted under 35 U.S.C. 154(b) by 168 days.

This patent is subject to a terminal disclaimer.

(21) Appl. No.: 11/876,222

(22) Filed: Oct. 22, 2007

(65) Prior Publication Data
US 2008/0215335 A1 Sep. 4, 2008

Related U.S. Application Data

(63) Continuation of application No. 10/448,786, filed on May 30, 2003, now Pat. No. 7,286,991.

(30) Foreign Application Priority Data
May 30, 2002 (JP) .............................. 2002-157836

(51) Int. Cl.
*G10L 11/00* (2006.01)
*G10L 21/00* (2006.01)
(52) U.S. Cl. ................................... 704/275
(58) Field of Classification Search ............. None
See application file for complete search history.

(56) References Cited

U.S. PATENT DOCUMENTS 5,133,011 A * 7/1992 McKiel, Jr. ................. 704/276

(Continued)

FOREIGN PATENT DOCUMENTS

| JP | 62-157938 | 7/1987 |
| JP | 06-342365 | 12/1994 |
| JP | 10-326175 | 12/1998 |
| JP | 2001-147761 | 5/2001 |

OTHER PUBLICATIONS

Allen and Harper, "2pSC6. Interactive prosody training workstation," ASA 131$^{st}$ Meeting, Indianapolis, IN, May 1996, http://www.auditory.org/asamtgs/asa96ind/2pSC/2pSC6.html, downloaded Mar. 20, 2007.

(Continued)

*Primary Examiner*—David R Hudspeth
*Assistant Examiner*—Justin W Rider
(74) *Attorney, Agent, or Firm*—Wolf, Greenfield & Sacks, P.C.

(57) ABSTRACT

To provide a pointer position control method and the like for manipulating a pointer more easily. The user moves the pointer P two-dimensionally and perform click and other operations by using only "voice"—by varying the volume and pitch of produced voice without uttering any specific command. The user moves the pointer P by varying the volume and switches the travel direction of the pointer P by changing the pitch. Also, by stopping to vary the volume, the user can automatically enter a fine adjustment mode in which the user can make fine adjustments. Furthermore, the user can perform a click by stopping to produce voice suddenly and return to normal speech recognition mode by keeping silent.

4 Claims, 9 Drawing Sheets

U.S. PATENT DOCUMENTS

| | | | |
|---|---|---|---|
| 5,920,841 | A | 7/1999 | Schottmuller et al. |
| 6,208,359 | B1 | 3/2001 | Yamamoto |
| 6,297,818 | B1 | 10/2001 | Ulrich et al. |
| 6,519,566 | B1 * | 2/2003 | Boyer et al. ................ 704/275 |
| 2003/0018477 | A1 | 1/2003 | Hinde |
| 2008/0215335 | A1 | 9/2008 | Tahara et al. |

OTHER PUBLICATIONS

Olwal et al., "Using prosodic features of speech and audio localization in graphical user interface", 1-4 (Jun. 2003), New York.

Lee, "Painting noise sound,", 2-8 (2003) Stanford University.

U.S. Patent and Trademark Office Action from U.S. Appl. No. 11/266,738 dated Jun. 27, 2008 (13 pages).

U.S. Patent and Trademark Office Action from U.S. Appl. No. 11/266,738 dated Oct. 15, 2008 (14 pages).

U.S. Patent and Trademark Office Action from U.S. Appl. No. 11/266,738 dated Apr. 16, 2009 (17 pages).

U.S. Patent and Trademark Office Action from U.S. Appl. No. 11/266,738 dated Jan. 19, 2010 (16 pages).

* cited by examiner

COMPUTER, DISPLAY CONTROL DEVICE, POINTER POSITION CONTROL METHOD, AND PROGRAM

CROSS-REFERENCE TO RELATED APPLICATIONS

This application is a Continuation of U.S. application Ser. No. 10/448,786, filed on May 30, 2003 now U.S. Pat. No. 7,286,991, which is incorporated herein by reference in their entirety.

FIELD OF THE INVENTION

The present invention relates to a pointer position control method and the like for manipulating a pointer displayed on a display screen.

BACKGROUND

As is well known, the mouse is used widely as one of the user interfaces for operating a PC (Personal Computer). The mouse is moved on the desktop by the user to manipulate a pointer displayed on a monitor.

Recently, other user interfaces that use speech recognition have been attracting attention. These user interfaces, that recognize voice entered through a microphone and thereby allow sentences or the like to be entered, can be used instead of a keyboard. As an additional feature of speech recognition applications, something called a voice mouse or the like is available. The voice mouse allows the user to manipulate a pointer displayed on a monitor by uttering designated commands through a microphone without using a mouse.

However, prior art technologies for manipulating the pointer through speech recognition in the manner described above have the following problems.

First, to shift from normal speech recognition input mode to pointer manipulation mode, to move the pointer, to stop the pointer, to click or double-click, and so on, the user must utter appropriate commands. Therefore, the user must remember a large number of commands.

Also, the commands for moving the pointer include, for example, those that represent travel directions such as "Up," "Down," "Left," "Right," etc., distance of travel such as "5 cm," etc., and speed of travel such as "Fast," "Slow," etc. It is difficult to point to a desired position on a screen swiftly using these commands properly.

Furthermore, to shift to pointer manipulation mode from normal speech recognition input mode, move the pointer to a desired position, and click on that position, the user must utter a number of commands one after another and may find this troublesome.

In addition, the user must move the pointer subtly, for example, to position the pointer on a small icon, but it is difficult to perform such manipulations using commands such as those described above.

Such pointer manipulation through speech recognition as described above is intended especially for users for whom it is difficult to manipulate a mouse manually, and thus improvement of usability presents an important challenge.

The present invention has been made to solve the above technical challenge. Its object is to provide a pointer position control method and the like for manipulating a pointer more easily.

SUMMARY OF THE INVENTION

To achieve the above object, a computer according to the present invention uses volume detection means for detecting the volume of voice entered from outside through voice input means and uses frequency detection means for detecting the frequency of the voice. It uses pointer control means for controlling the operation of a pointer displayed on a display screen of a display means, based on the detected volume and frequency.

In doing that, the pointer control means can control the position of the pointer based on the volume of voice and cause specific pointer operations to be performed based on the frequency. For example, the position of the pointer in one direction can be determined based on the greatness of the volume. The pointer can be moved in one direction as the volume increases, and in the opposite direction as the volume decreases. Preferably, the volume is associated one-to-one with position coordinates of the pointer using functions or the like. Specific commands executed based on the frequency include, for example, a command for switching the ratio of change in the position of the pointer to volume change in a number of steps if the frequency of voice remains within a certain range for a designated period of time or longer, and a command for changing the travel direction of the pointer according to changes in the frequency of voice, i.e., in pitch.

The computer can further comprise a speech recognition means for recognizing words in the voice entered through the voice input means. In that case, switching between pointer control mode by the pointer control means and speech recognition mode by the speech recognition means can be done based on changes in the detected volume or frequency.

A display control device according to the present invention uses a voice detecting unit for detecting the volume of voice entered from outside, uses a frequency detecting unit for detecting the frequency of the voice, and uses a pointer controlling unit for moving a pointer displayed on a display area of a display device to the position corresponding to the detected volume. Here, the pointer controlling unit has a plurality of modes differing in the amount of pointer travel relative to changes in the volume and can switch among the modes when a specific command is entered. In short, different amounts of pointer travel can be used for the same amount of volume change by switching among the modes. This makes it possible to use different modes depending on situations: a mode in which the pointer is moved greatly and a mode in which the pointer is moved slightly for fine adjustment or the like. Specific commands for switching between the modes include a command that results if a volume in a certain range is detected for a designated period of time.

Besides, the pointer controlling unit can highlight the position of the pointer in the travel direction in the display area of the display device by using, for example, an indicator line displayed according to the position of the pointer. Also, the pointer controlling unit can indicate a movable range of the pointer using different colors in the case of a mode in which the amount of pointer travel relative to changes in the volume is relatively small.

Such a display control device is intended to control the pointer displayed in the display area of a display device as described above and need not necessarily comprise the display device as an integral part.

On the other hand, the present invention can be viewed as a pointer position control method comprising the steps of moving the position of a pointer according to the volume of voice entered from outside, and switching the travel direction of the pointer according to the frequency of the voice. This makes it possible to move the pointer by voice at least in two directions.

Also, it is possible to execute a specific command—such as a click operation—associated with the position of the pointer at a time when the frequency of the voice changes in a certain manner.

Furthermore, it is possible to finish controlling the position of the pointer by voice if the volume remains at or below a designated level for a certain period of time.

A program according to the present invention makes a computer execute a process (a) of detecting the volume and frequency of voice entered from outside, a process (b) of moving the position of a pointer according to the detected volume, and a process (c) of switching the travel direction of the pointer to be displayed on a display device according to the detected frequency. In the process (b), it is possible to switch between a mode in which a change in the volume corresponds to a first amount of pointer travel and a mode in which a change in the volume corresponds to a second amount of pointer travel. Thus, by switching between the modes, it is possible to switch between different amounts of pointer travel for the same amount of volume change. A criterion for switching between the modes can be that the detected volume remains within a certain range for a designated period of time.

Also, the program can further make the computer to execute a process (d) of recognizing words in the voice entered from outside. In other words, the program functions as a so-called speech recognition application. The program can bring about a shift to the process (b) if the frequency remains within a designated range for a certain period of time in the process (d). Conversely, it can bring about a shift to the process (d) if the volume remains at or below a designated level for a certain period of time in the process (b).

DETAILED DESCRIPTION

The present invention will be described in detail below with reference to an embodiment shown in the accompanying drawings.

Figure 1:
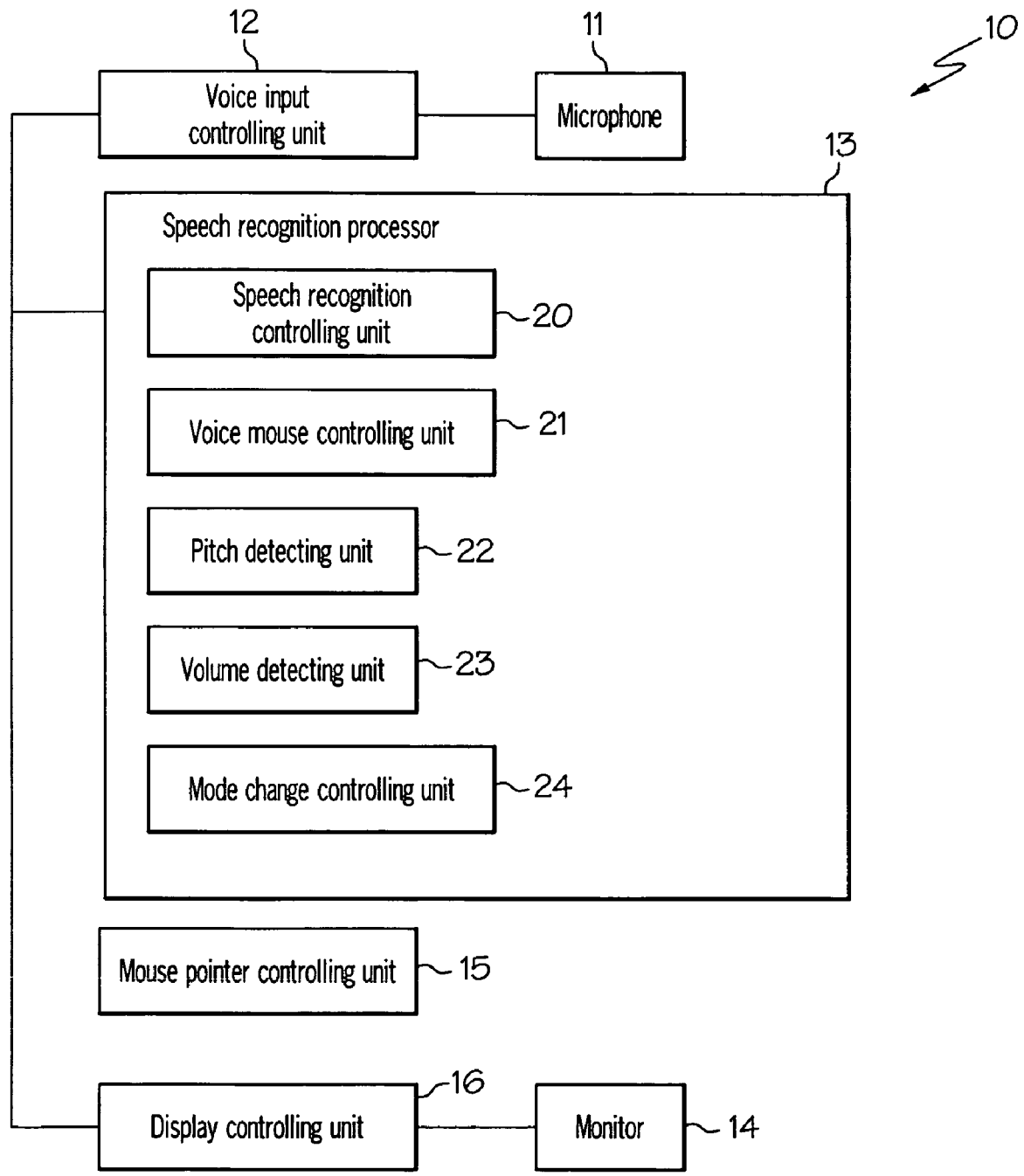
FIG. 1 is a diagram showing a functional configuration of a computer according to an embodiment of the present invention.

FIG. 1 is a diagram illustrating a functional configuration of a computer according to an embodiment of the present invention. As shown in FIG. 1, a computer 10 is configured as a desktop PC, notebook PC, or the like. It comprises a voice input controlling unit 12 that digitizes voice entered through a microphone (voice input means) 11, a speech recognition processor 13 that takes charge of speech recognition processes, a mouse pointer controlling unit 15 that controls the display of a pointer on a monitor (display means) 14, and a display controlling unit 16 that controls the display on the monitor 14.

In the above configuration, functions of the speech recognition processor 13 are implemented when a speech recognition application program installed on the computer 10 makes a CPU of the computer 10 execute designated processes.

The speech recognition processor 13 comprises a speech recognition controlling unit (speech recognition means) 20 that takes charge of sentence input by voice in a speech recognition mode, a voice mouse controlling unit 21 that takes charge of pointer operation by voice in voice mouse mode, a pitch detecting unit 22 that detects the pitch of the voice produced by the user, a volume detecting unit 23 that detects the volume of voice, and a mode change controlling unit 24 that controls shifts between speech recognition mode and voice mouse mode.

Figure 2:
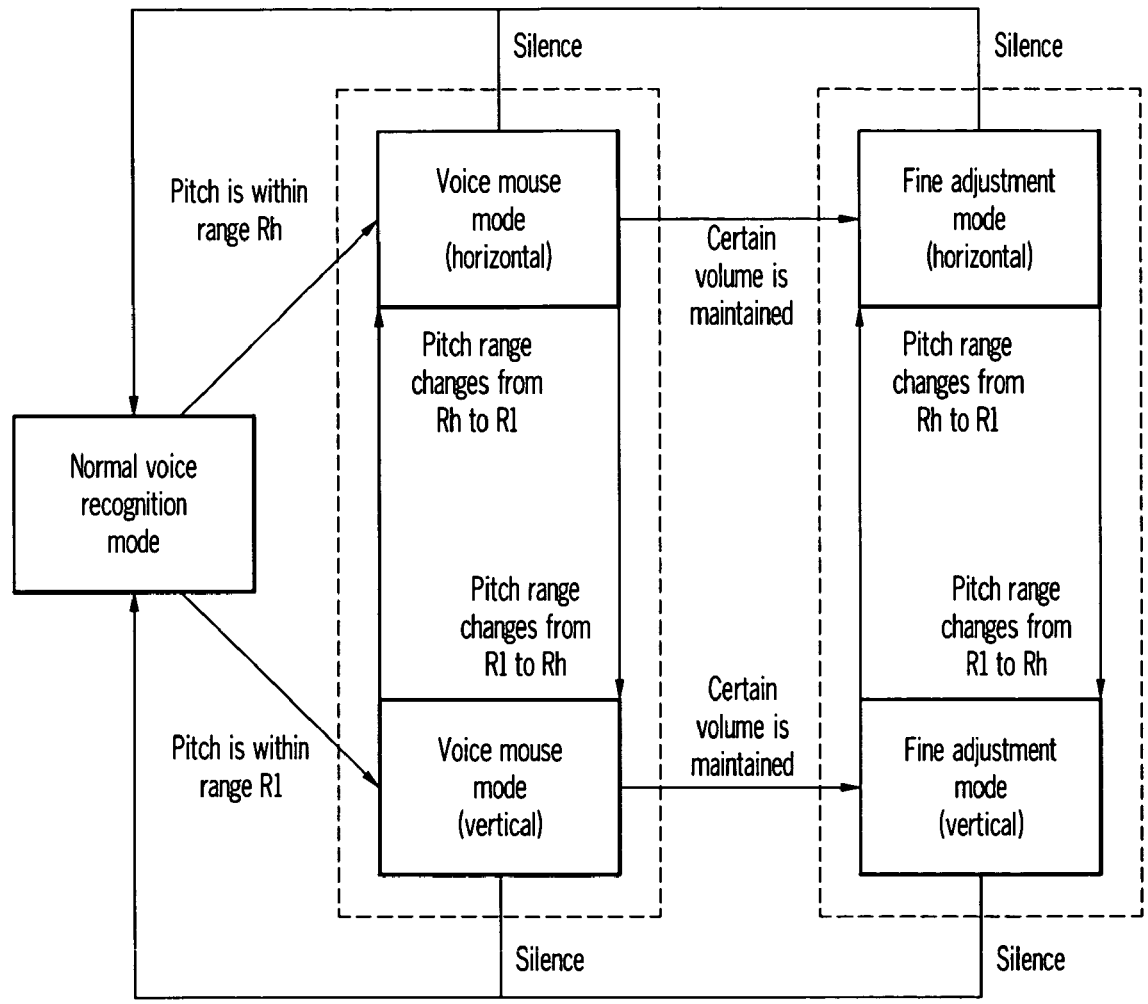
FIG. 2 is a diagram showing mode transitions.
Figure 3:
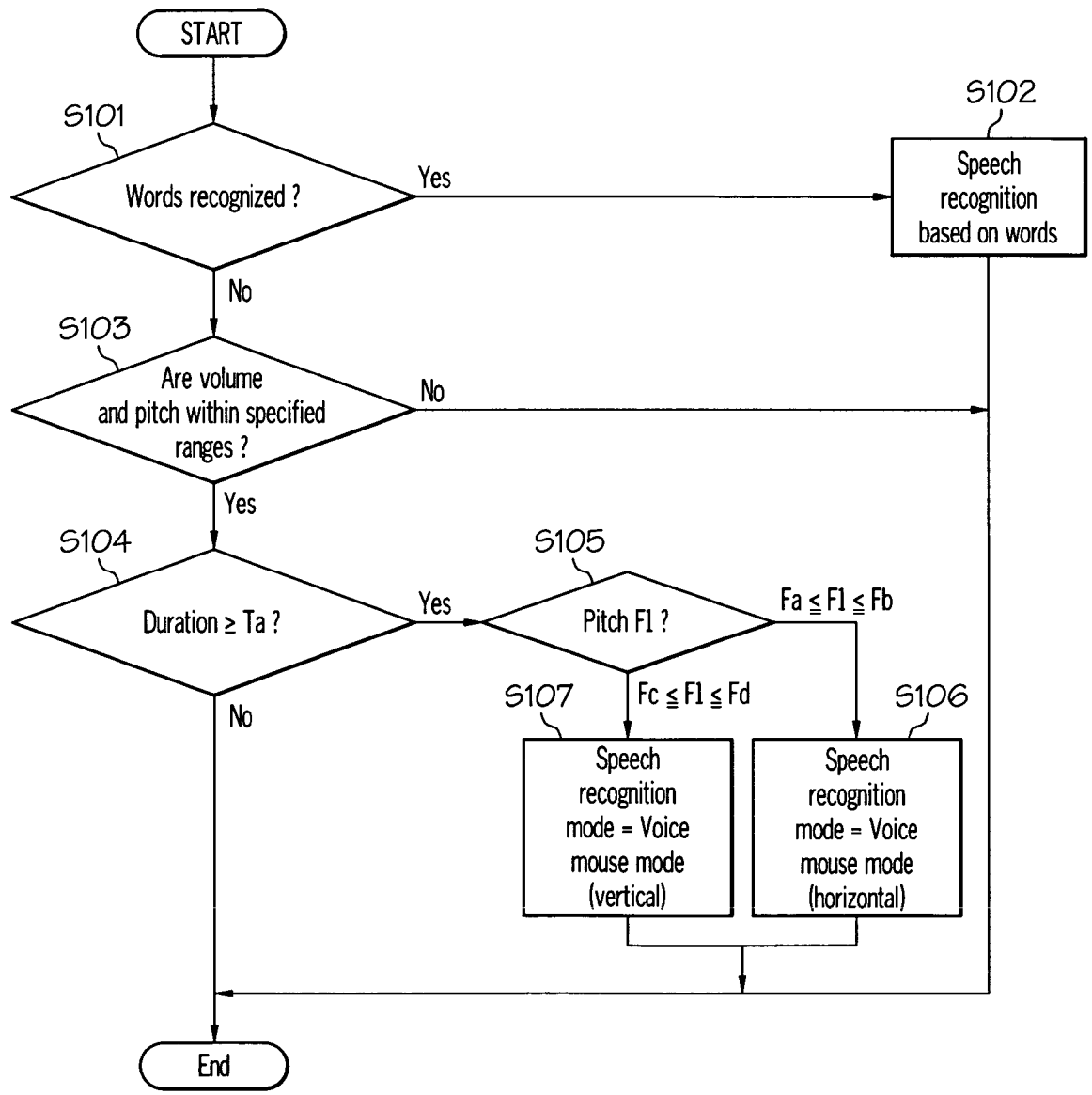
FIG. 3 is a diagram showing a flow of processes in normal speech recognition mode.

As shown in FIGS. 2 and 3, upon starting a speech recognition process, the speech recognition processor 13 first enters a normal speech recognition mode run by the speech recognition controlling unit 20.

In the normal speech recognition mode, by analyzing user's voice entered from the microphone 11 via the voice input controlling unit 12, the words formed by the voice produced by the user are recognized based on preregistered data. Then, based on these words, it is possible to enter sentences or execute commands (Steps S101 and S102).

In the normal speech recognition mode, if a voice in a certain range of pitch and volume containing no recognizable word is detected by the pitch detecting unit 22 and volume detecting unit 23 for a designated period of time Ta, a shift into the voice mouse mode run by the voice mouse controlling unit 21 takes place (Steps S103 to S107).

In this normal speech recognition mode, if an average volume Va of the detected voice is constant and the pitch F1 is in a designated range Rh($Fa \leq F1 \leq Fb$), the voice mouse mode in which the pointer is moved horizontally across a display area of the monitor 14 is entered (hereinafter referred to as the horizontal voice mouse mode) (Steps S105 and S106). If the pitch F1 is in a designated range R1($Fc \leq F1 \leq Fd$), the voice mouse mode in which the pointer is moved vertically across the display area of the monitor 14 is entered (hereinafter referred to as the vertical voice mouse mode) (Steps S105 and S107). Here, it is assumed, for example, that $Fa \leq Fb \leq Fc \leq Fd$. In other words, the horizontal voice mouse mode is entered if the pitch is low and the vertical voice mouse mode is entered if the pitch is high.

Figure 4:
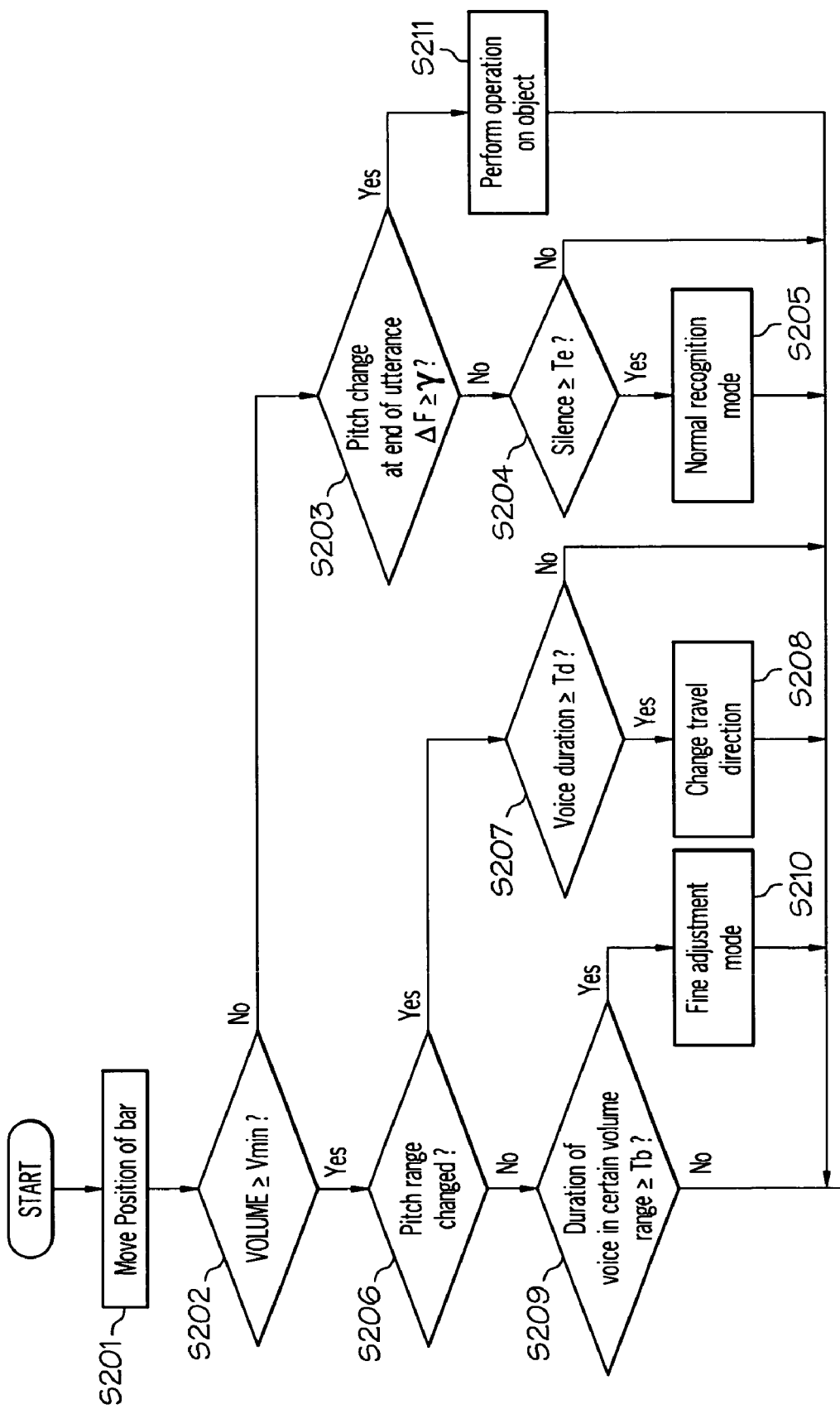
FIG. 4 is a diagram showing a flow of processes in voice mouse mode.

As shown in FIG. 4, in the horizontal voice mouse mode or vertical voice mouse mode run by the voice mouse controlling unit 21, according to the average volume Va of the volumes detected by the pitch detecting unit 22 for the last designated period of time, the pointer displayed on the monitor 14 by the mouse pointer controlling unit 15 is moved horizontally or vertically, respectively, across the display area of the monitor 14 (Step S201). Here, the average volume Va detected by the volume detecting unit 23 must remain within a predetermined range ($Vmin \leq Va \leq Vmax$). Also, the pitch F1 detected by the pitch detecting unit 22 must remain within the range Rh in the case of the horizontal voice mouse mode, and within the range R1 in the case of the vertical voice mouse mode.

To move the pointer according to the average volume Va, data that associates the average volume Va one-to-one with horizontal and vertical position coordinates X and Y of the pointer in the display area of the monitor 14 is stored in a designated data storage area of the computer 10. As a method for associating the average volume Va one-to-one with the vertical position coordinates X and Y, the following functions can be used:

$$X = F(Va)$$

$$Y = G(Va)$$

where X is greater than the position coordinate at the left end of the display area and less than the position coordinate at the right end of the display area, and Y is greater than the position coordinate at the bottom end of the display area and less than the position coordinate at the top end of the display area.

Figure 5A:
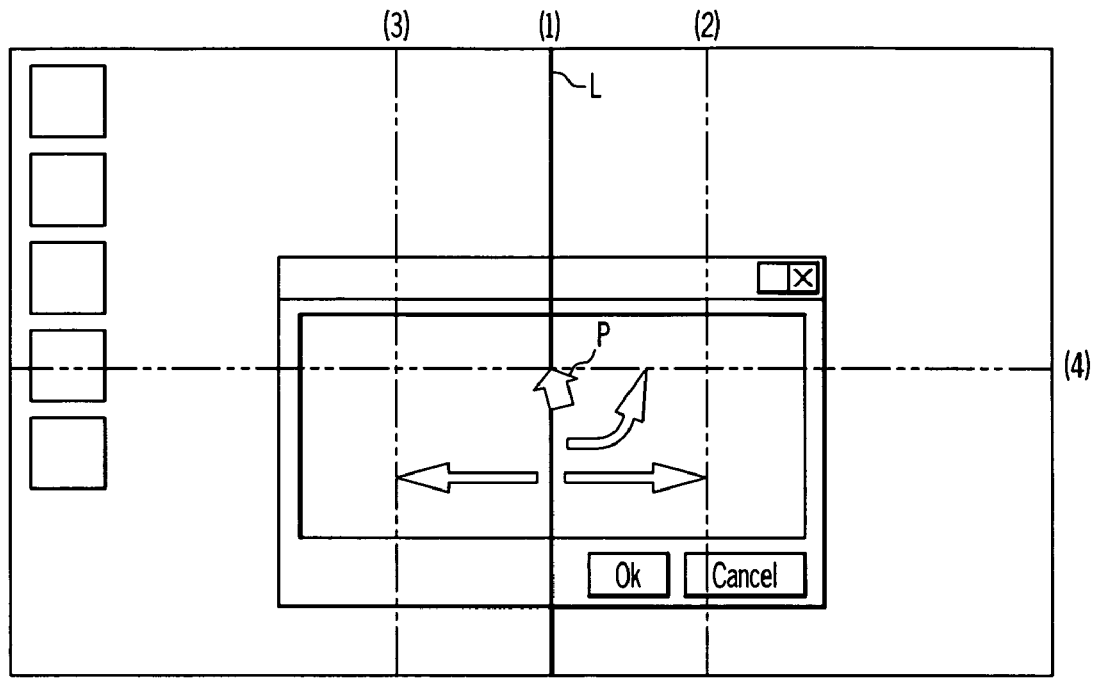
FIG. 5 is an example of display screens in which a pointer is moved by voice.
Figure 5B:
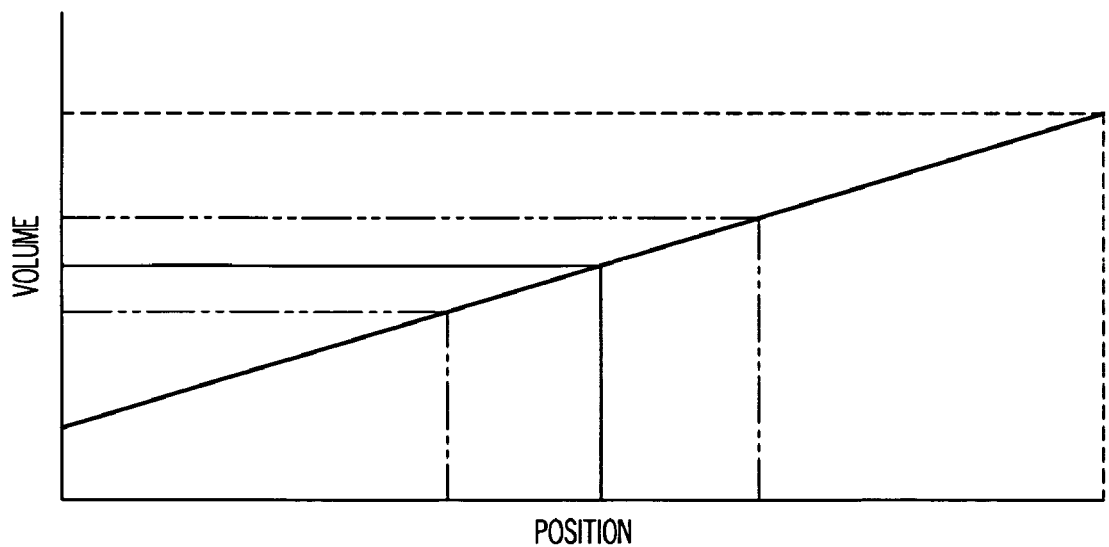

It is preferred that the functions F and G be linear functions, such as the one shown in FIG. 5b, but non-linear functions or the like may also be used.

In the voice mouse mode, to indicate the pointer more clearly in the display area of the monitor 14, the mouse pointer controlling unit 15 displays an indicator line L along a position coordinate of the pointer P, as shown in FIG. 5a. In the horizontal voice mouse mode in which the pointer P is moved horizontally, the indicator line L is displayed as a line extending vertically, and in the vertical voice mouse mode in which the pointer P is moved vertically, the indicator line L is displayed as a line extending horizontally.

In the example of FIG. 5a, the indicator line L moves to the right (e.g., to position (2)) from position (1) in the display area as the average volume Va increases and it moves to the left (e.g., to position (3)) on the display as the average volume Va decreases.

As shown in FIGS. 2 and 4, in the horizontal voice mouse mode or vertical voice mouse mode run by the voice mouse controlling unit 21, if the volume detected by the volume detecting unit 23 continues to be lower than a lower limit Vmin for a designated period of time Te, it is determined that silence has settled after the end of utterance, and a mode shift occurs to return to the normal speech recognition mode (Steps s202 to S205).

In the horizontal voice mouse mode, if the range of the voice pitch F1 detected by the pitch detecting unit 22 changes from Rh to Rl and the voice remains in the range Rl for a designated period of time Td or longer, the horizontal voice mouse mode is changed to the vertical voice mouse mode) and the travel direction of the pointer P is changed from horizontal to vertical (Steps s206 to S208). Conversely, in the vertical voice mouse mode, if the range of the voice pitch F1 detected by the pitch detecting unit 22 changes from Rl to Rh and the voice remains in the range Rh for the designated period of time Td or longer, the vertical voice mouse mode is changed to the horizontal voice mouse mode and the travel direction of the pointer P is changed from vertical to horizontal (Steps S206 to S208). Immediately after the changes, the indicator line L switches from vertical to horizontal or from horizontal to vertical as indicated by (4) in FIG. 5a. It is displayed along the position of the pointer P at that time.

As shown in FIGS. 2 and 4, in the horizontal voice mouse mode and vertical voice mouse mode run by the voice mouse controlling unit 21, if an average volume V2 detected by the volume detecting unit 23 remains in a certain range σ for a designated period of time Tb (step S209), a fine adjustment mode is entered for whichever mode, horizontal or vertical, that is in effect.

In the horizontal voice mouse mode or vertical voice mouse mode, if the volume detected by the volume detecting unit 23 is lower than the lower limit Vmin and it can be determined that utterance has ended, it is judged whether the pitch change ΔF in the last designated period of time Tc is equal to or larger than a preset value γ(i.e., ΔF≧γ is satisfied). If this condition is satisfied, the voice mouse controlling unit 21 performs an appropriate operation such as clicking or double-clicking on the object that is pointed to by the pointer P (Steps S203 and S211).

The designated period of time Tc described above is set by going back a predetermined period of time Ta2 from the time when the volume detected by the volume detecting unit 23 finally became 0 (zero). This eliminates the possibility that the user's voice may shake unintentionally when he/she ends utterance.

It is also possible to prepare multiple patterns of pitch changes ΔF and determine the operation to be performed on the object pointed to by the pointer P, according to the detected pattern of pitch changes ΔF. Such operations include, for example, not only single-click and double-click operations, but also a so-called left-click-and-hold operation for dragging, operation of releasing the left-click at the end of dragging, right-click operation, etc.

Figure 6:
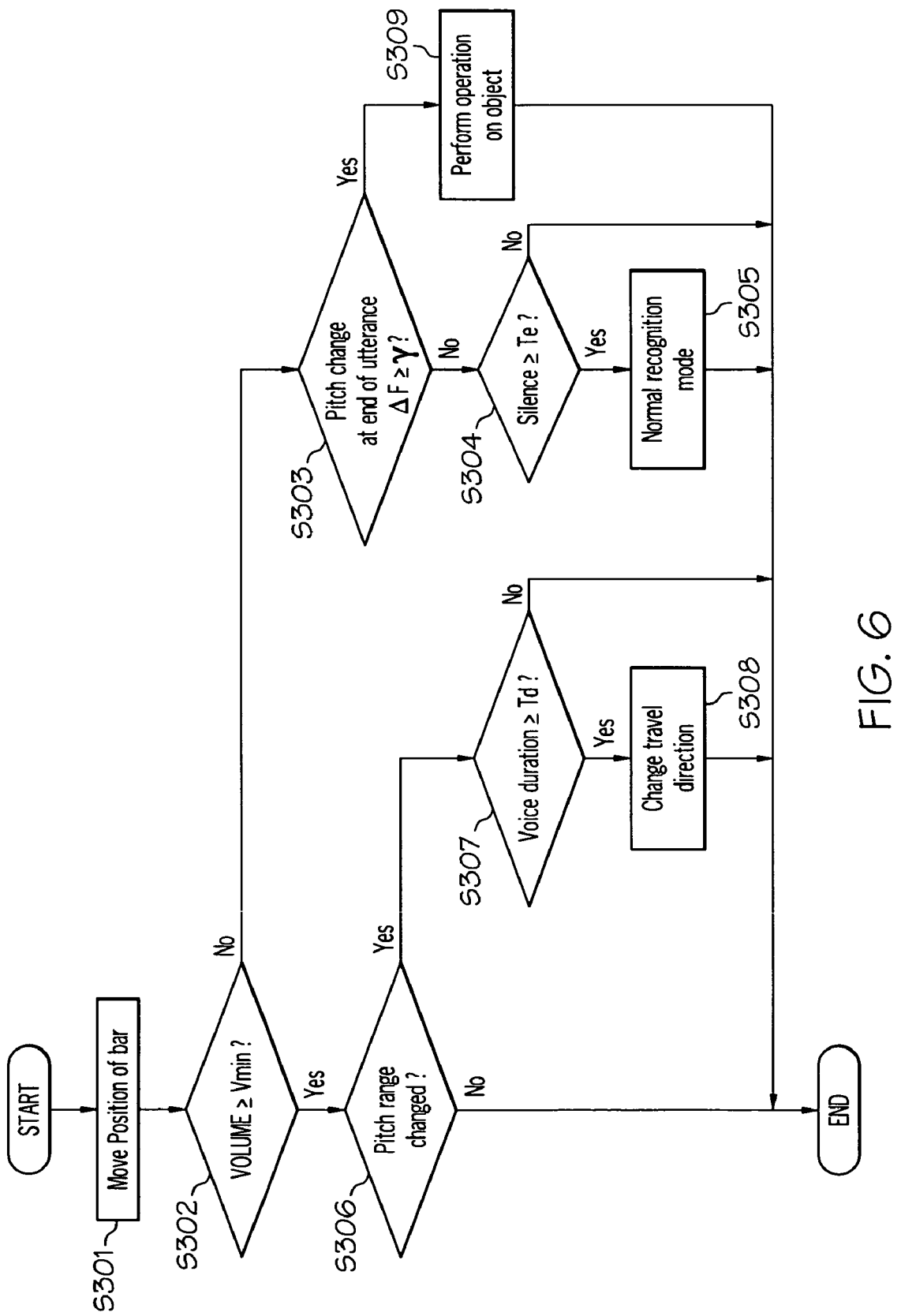
FIG. 6 is a diagram showing a flow of processes in fine adjustment mode.

FIG. 6 shows the steps performed while in fine adjustment mode for both vertical and horizontal voice mouse operation. This mode is run by the voice mouse controlling unit 21, according to the average volume Vb that is the average of the volumes detected by the pitch detecting unit 22 for the last designated period of time. The pointer P displayed on the monitor 14 by the mouse pointer controlling unit 15 is moved horizontally or vertically across the display area of the monitor 14 (Step S301) according to which mode, horizontal or vertical, is in effect. Here, the average volume Vb must remain within a predetermined range (Vmin≦Va≦Vmax). Also, the voice pitch F1 detected by the pitch detecting unit 22 must remain within the range Rh in the case of the horizontal voice mouse mode, and within the range Rl in the case of the vertical voice mouse mode.

The amount of travel of the pointer P for a given volume change is smaller in the fine adjustment mode than in the normal horizontal voice mouse mode and vertical voice mouse mode.

To move the pointer P according to the average volume Vb, the average volume Vb is associated one-to-one with horizontal and vertical position coordinates X and Y in the display area of the monitor 14 using the following functions defined in advance:

$$X=P(Vb)$$

$$Y=Q(Vb)$$

As for the functions P and Q, linear functions are preferable, but non-linear functions or the like may also be used.

Suppose, after a shift from horizontal voice mouse mode to horizontal fine adjustment mode or from vertical voice mouse mode to vertical fine adjustment mode, the position coordinates of the pointer P are (Xa, Ya). Then, x is given by $$Xa-\alpha \leq X \leq Xa+\alpha,$$

and Y is given by $$Ya-\beta \leq Y \leq Ya+\beta$$

(where α and β are preset values).

In other words, the moving range of the pointer P in the fine adjustment mode is set smaller than the display area of the monitor 14.

To move the pointer P in such a moving range according to the detected average volume Vb, the functions P and Q are defined in such a way as to make the amount of travel for a given volume change smaller than in the normal horizontal voice mouse mode or vertical voice mouse mode.

Figure 7A:
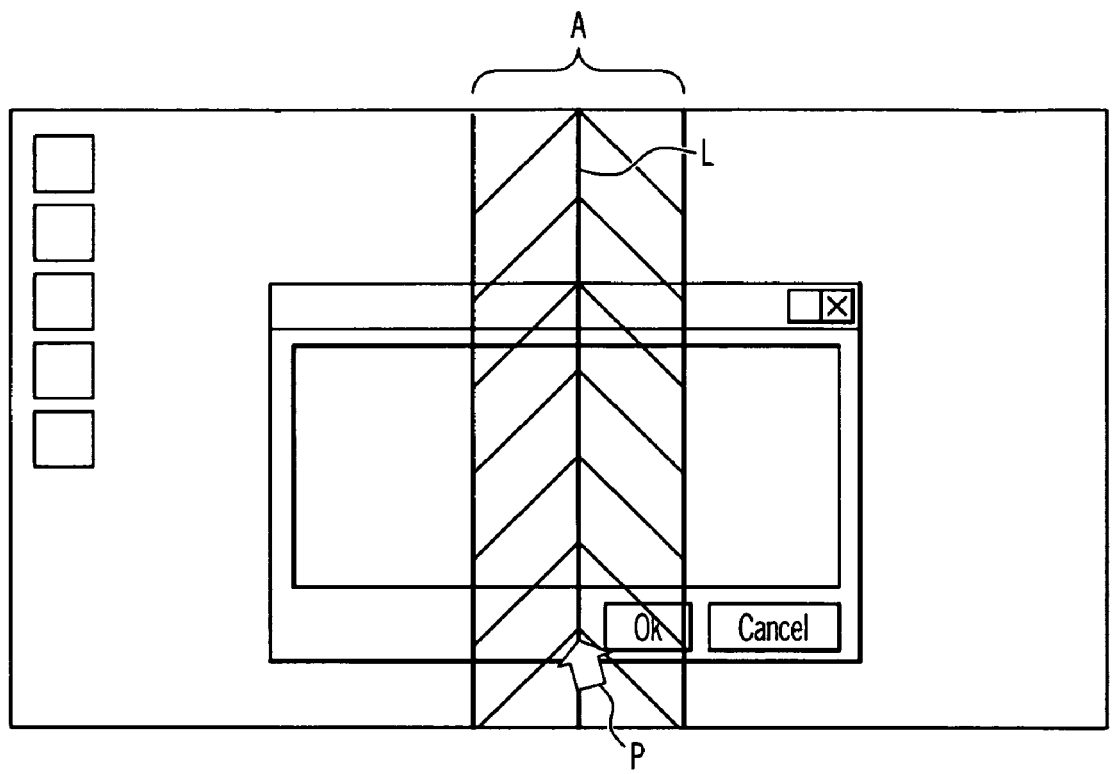
FIG. 7 shows examples of display screens in fine adjustment mode.
Figure 7B:
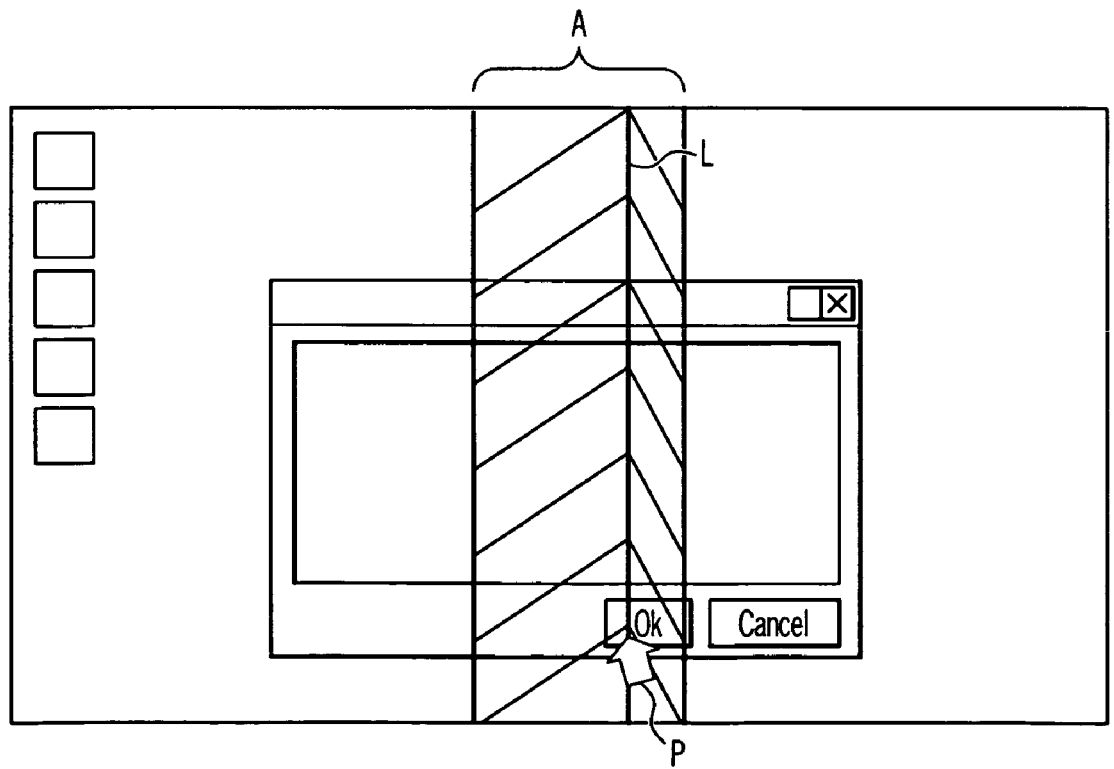

In the fine adjustment mode, to indicate the position of the pointer P more clearly in the display area of the monitor 14, the mouse pointer controlling unit 15 displays an indicator line L along a position coordinate of the pointer P, as shown in FIGS. 7a and 7b. In the horizontal fine adjustment mode in which the pointer P is moved horizontally, the indicator line L is displayed as a line extending vertically, and in the vertical fine adjustment mode in which the pointer P is moved vertically, the indicator line L is displayed as a line extending horizontally. The moving range of the pointer P is limited as described above and the movable range A of the pointer P is indicated clearly on the monitor 14 using different colors.

As shown in FIG. 6, in the fine adjustment mode, if the volume detected by the volume detecting unit 23 continues to be lower than the lower limit Vmin for a designated period of time Te, it is determined that silence has settled after the end of utterance, and a mode shift occurs to return to the normal speech recognition mode (Steps S302 to S305).

In the horizontal fine adjustment mode, if the range of the voice pitch F1 detected by the pitch detecting unit 22 changes from Rh to R1 and the voice remains in the range R1 for the designated period of time Td or longer, the horizontal fine adjustment mode is changed to the vertical fine adjustment mode and the travel direction of the pointer P is changed from horizontal to vertical. Conversely, in the vertical fine adjustment mode, if the range of the voice pitch F1 detected by the pitch detecting unit 22 changes from R1 to Rh and the voice remains in the range Rh for the designated period of time Td or longer, the vertical fine adjustment mode is changed to the horizontal fine adjustment mode and the travel direction of the pointer P is changed from vertical to horizontal (Steps S306 to S308).

If the volume detected by the volume detecting unit 23 is lower than the lower limit Vmin and it can be determined that utterance has ended, it is judged whether the pitch change ΔF in the last designated period of time Tc is larger than the preset value γ (i.e., ΔF>γ is satisfied) (Steps S302 and S303). If this condition is satisfied, the voice mouse controlling unit 21 performs an appropriate operation such as clicking or double-clicking on the object that is pointed to by the pointer P (Step S309).

Again, the designated period of time Tc described above is set by going back a predetermined period of time Ta2 from the time when the volume detected by the volume detecting unit 23 finally became 0 (zero).

Thus, by keeping the volume Va and pitch F1 of produced voice constant for a predetermined period of time Ta or longer, the user can shift from the normal speech recognition mode into the horizontal voice mouse mode or vertical voice mouse mode. By raising or lowering the pitch F1 of produced voice, the user can select the horizontal voice mouse mode or vertical voice mouse mode. Then, after the shift into the horizontal voice mouse mode or vertical voice mouse mode, the user can move the pointer P in the horizontal or vertical direction by increasing or decreasing the volume Va of produced voice. When the pointer P approaches a desired location in the horizontal or vertical direction, the user can switch from horizontal voice mouse mode to vertical voice mouse mode or from vertical voice mouse mode to horizontal voice mouse mode, as required, by raising or lowering the pitch F1 of produced voice.

In this way, after bringing the pointer P close to a desired location by switching the travel direction of the pointer P to horizontal or vertical, as required, the user can switch from horizontal voice mouse mode or vertical voice mouse mode to horizontal fine adjustment mode or vertical fine adjustment mode by maintaining the volume of produced voice for the designated period of time Tb or longer. Then, by increasing or decreasing the volume Va of produced voice, the user can fine-adjust the position of the pointer P in the horizontal or vertical direction.

When the pointer P reaches the desired location, the user can perform an appropriate operation such as clicking or double-clicking on the object pointed to by the pointer P at that time. This can be done by stopping to produce voice suddenly or the like, thereby making the pitch change ΔF in the designated period of time Tc larger than a preset value γ.

When the designated period of time Te elapses after stopping utterance, the user can exit the horizontal voice mouse mode, vertical voice mouse mode), fine adjustment mode (horizontal, or fine adjustment mode (vertical) and return to the normal speech recognition mode.

Figure 8:
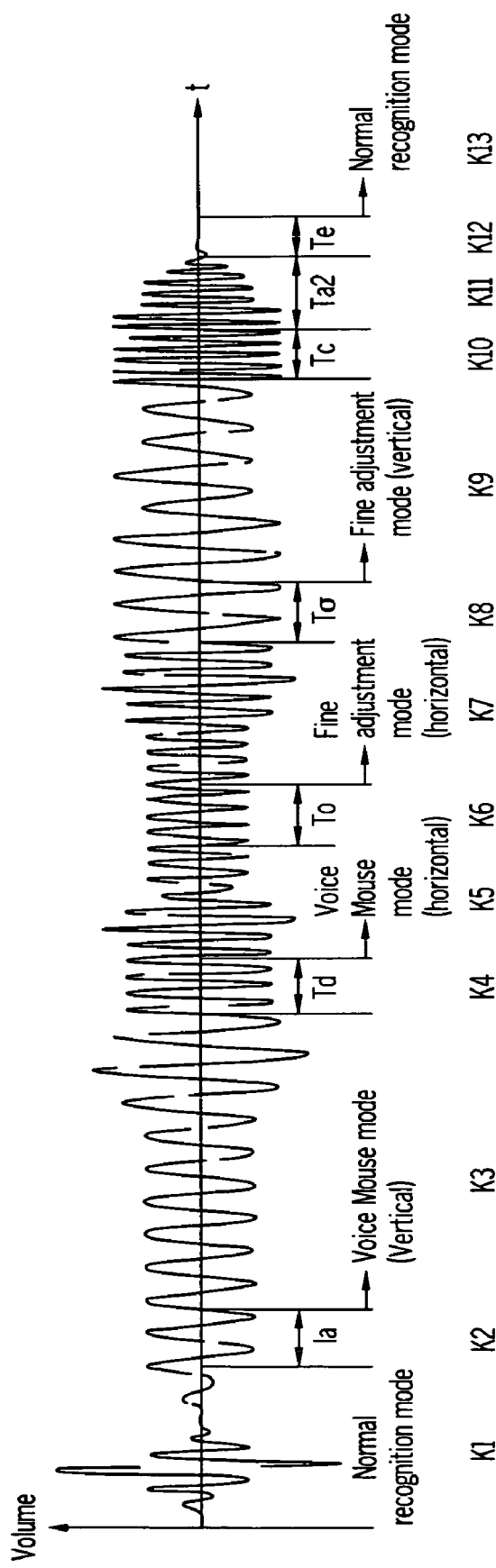
FIG. 8 is an example of detected voice waveforms.
Figure 9A:
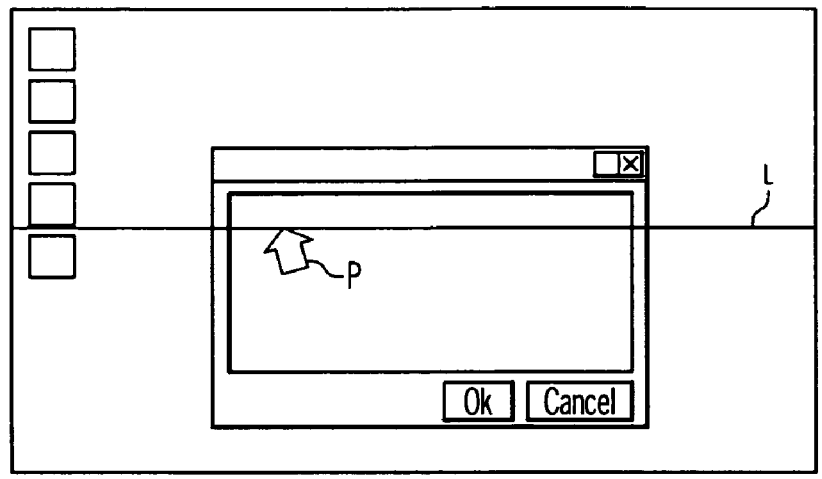
FIG. 9 shows examples of display screens in which a pointer is moved in voice mouse mode.
Figure 9B:
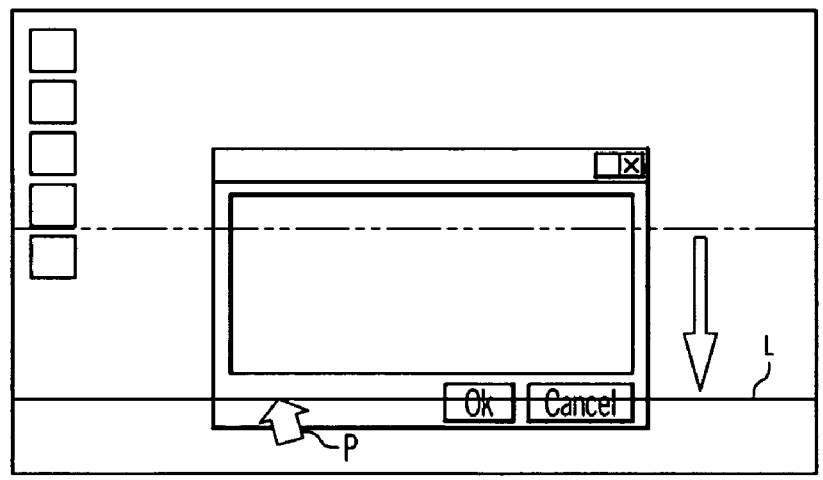

FIG. 8 shows an example of waveforms detected when the user manipulates the pointer P by actually producing voice in such a system of operations as described above. In the figure, the user utters normal words in a segment K1. Then, by maintaining a volume and pitch (e.g., a low pitch) for the designated period of time Ta or longer in a segment K2, the user shifts to the vertical voice mouse mode in the next segment K3. As shown in FIGS. 9a and 9b, by varying the volume in this state, the user brings the pointer P close to a desired location in the vertical direction.

Figure 9C:
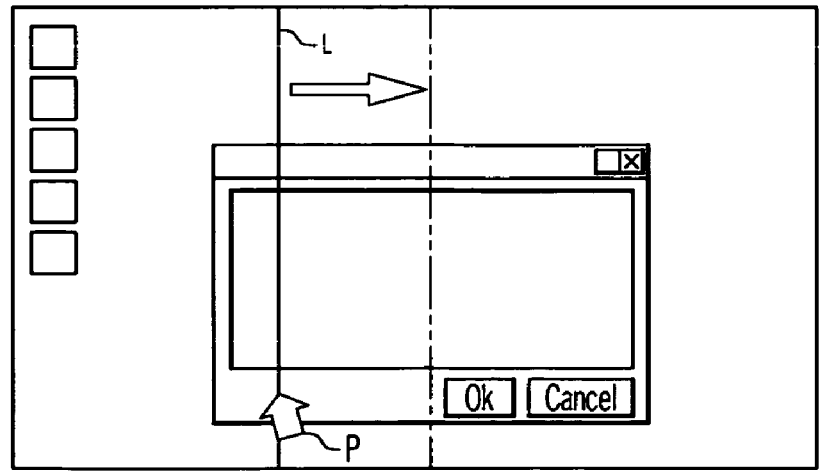

By raising the pitch of produced voice and maintaining the raised pitch for the designated period of time Td or longer in the next segment K4, the user shifts to the horizontal voice mouse mode in segment K5. Then, as shown in FIG. 9C, by varying the volume in this state, the user brings the pointer P close to a desired location in the horizontal direction.

As shown in FIGS. 7a and 7b, when the pointer P reaches the desired location, the user shifts to the fine adjustment mode (horizontal by maintaining the volume for the designated period of time Tb or longer (segment K6). Then, the user fine-adjusts the horizontal position of the pointer P by varying the volume (segment K7).

Now, by lowering the pitch of produced voice and maintaining the lowered pitch for the designated period of time Td or longer (segment K8), the user shifts to the vertical fine adjustment mode. Then, by varying the volume in this state, the user brings the pointer P close to the desired location in the vertical direction (segment K9).

Finally, when the pointer P is placed at the desired location, by changing the pitch suddenly within the designated period of time Tc, it is possible to perform a click or the like on the position of the pointer P (segment K10). Here, the designated period of time Tc is set by going back the predetermined period of time Ta2 (segment K11) from the time when silence settled.

After the silence continues for the designated period of time Te (segment K12), a mode shift occurs to revert to the normal speech recognition mode (segment K13).

The computer 10 described above allows the user to move the pointer P two-dimensionally and perform click and other operations by using only "voice" in a hands-free manner—by varying the volume and pitch of produced voice without uttering any specific command.

Since the pointer P can be moved by varying the volume, the user knows the travel direction of the pointer P (up-down or right-left direction) intuitively. Also, by stopping to vary the volume when the pointer P approaches a desired location, the user can automatically enter a fine adjustment mode in which the user can make fine adjustments, and thus there is not much chance that the user will feel odd. Furthermore, in a form of pointer manipulation in which only volume and pitch are varied, since the travel direction of the pointer P can be switched by changing the pitch rather than the volume that is used to move the pointer P, the user can have an intuitive grasp of the situation. In addition, the user can perform a click by stopping to produce voice suddenly and return to normal speech recognition mode by keeping silent. This also contributes greatly to simplification of operation.

Although a PC has been cited as an example of the computer 10 in the above embodiment, a similar technology can also be applied to PDAs, portable telephone terminals, Internet-ready television sets, various display terminals, etc. as long as the devices concerned can accept voice input when outfitted with an internal or external microphone. The above technology is not limited to pointers P designed to be manipulated by a mouse, and it can also be applied to pointers manipulated by keys, buttons, and the like on various pointing devices.

Also, although an example in which the pointer P is moved in two directions has been cited in the above embodiment, it is also possible to move the pointer P in one direction on a portable telephone terminal or the like. In that case, the function of switching the travel direction by pitch variation can be omitted, and mouse operations, switching between voice mouse mode and fine adjustment mode, etc. can be controlled by pitch variation.

Furthermore, although mode changes, pointer P movements, click operations, etc. are all controlled by volume and pitch in the above embodiment, it is also possible to perform part of these operations by conventional commands.

In addition, although the above embodiment uses functions to associate detected volumes and position coordinates of the pointer P one-to-one with each other for the purpose of moving the pointer P, it is also possible to use a table that associates the volumes and position coordinates with each other.

Although in the above embodiment, the pointer P is moved by varying volume while mode changes, click operations, etc. are carried out using pitch, naturally it is also possible to interchange volume and pitch: move the pointer P by pitch and carry out mode changes by volume. However, the configuration according to the above embodiment is desirable from an ergonomic standpoint, considering the fact that the user actually produces voice.

Also, the programs for moving the pointer and the like by voice according to the above embodiment may be provided in any of the following media.

Specifically, the programs to be executed by a computer may be stored in a computer-readable medium such as a CD-ROM, DVD, memory, or hard disk.

Besides, modifications may be made to the configuration of the above embodiment through selection, or other configurations may be used as required without departing from the spirit and scope of the present invention.

As described above, the present invention makes it possible to manipulate a pointer more easily by voice, and thereby improve usability for the user.

We claim:

1. A computer comprising:
voice input means for accepting voice input from outside;
volume detection means for detecting the volume of voice entered through said voice input means;
frequency detection means for detecting the frequency of the voice entered through said voice input means;
display means for displaying images on a display screen together with a pointer for pointing to the images; and
pointer control means for controlling the operation of said pointer based on the volume detected by said volume detection means and frequency detected by said frequency detection means by selecting an axis along which to move the pointer based on the detected frequency and selecting a direction on the selected axis in which to move the pointer based on the detected volume.

2. A computer comprising:
at least one display device;
at least one memory that stores processor-executable instructions for controlling the operation of a pointer displayed on the display device;
at least one processor, coupled to the memory and the display device, that executes the processor-executable instructions to:
receive voice input;
detect the volume of the voice input;
detect the frequency of the voice input;
control the operation of the pointer based on the detected volume and the detected frequency by selecting an axis along which to move the pointer based on the detected frequency and selecting a direction on the selected axis in which to move the pointer based on the detected volume.

3. A method for controlling the operation of a pointer displayed on a display device, the method comprising:
receiving voice input;
detecting the volume of the voice input;
detecting the frequency of the voice input;
controlling the operation of the pointer based on the detected volume and the detected frequency by selecting an axis along which to move the pointer based on the detected frequency and selecting a direction on the selected axis in which to move the pointer based on the detected volume.

4. At least one tangible computer-readable medium encoded with instructions that, when executed on a computer, perform a method for controlling the operation of a pointer displayed on a display device, the method comprising: receiving voice input; detecting the volume of the voice input; detecting the frequency of the voice input; controlling the operation of the pointer based on the detected volume and the detected frequency by selecting an axis along which to move the pointer based on the detected frequency and selecting a direction on the selected axis in which to move the pointer based on the detected volume.

* * * * *